United States Patent [19]

Duruz et al.

[11] 4,409,463

[45] Oct. 11, 1983

[54] MACHINE FOR CUTTING SHEET MATERIAL

[75] Inventors: Louis Duruz, Romanel; Jean-Marc Strehl, Lausanne, both of Switzerland

[73] Assignee: Raskin, S.A., Cheseaux/Lausanne, Switzerland

[21] Appl. No.: 314,193

[22] Filed: Oct. 23, 1981

[30] Foreign Application Priority Data

Oct. 23, 1980 [CH] Switzerland .......................... 7908/80

[51] Int. Cl.³ .............................................. B23K 27/00
[52] U.S. Cl. ......................... 219/121 LG; 219/121 FS
[58] Field of Search ................. 219/121 LG, 121 LN, 219/121 LY, 121 FS; 83/409, 435.1

[56] References Cited

U.S. PATENT DOCUMENTS 3,612,814 10/1971 Houldcroft .............. 219/121 LN X
4,328,411 5/1982 Haller et al. .............. 219/121 LG X Primary Examiner—C. L. Albritton
Attorney, Agent, or Firm—Silverman, Cass & Singer

[57] ABSTRACT

A machine for cutting sheet material by means of a laser beam comprises a table with an opening through which the laser beam passes and, situated under the table below the opening therein which is itself coaxial with the axis of the laser beam, a vessel containing a conical cap to deflect the rays of the laser beam with the object of dispersing the energy of the beam. This vessel contains an inclined grid which receives the work members cut out from the sheet, which members collect on the grid and can be periodically removed therefrom through an opening provided in the front wall of the vessel. A conduit for the evacuation of the residual cutting gas opens vertically below the cap. The waste (scoria, calamine) as well as the coolant or lubrication liquid passes through the grid and accumulates at the bottom of the lower part of the vessel. This liquid is evacuated through a pipe.

6 Claims, 4 Drawing Figures

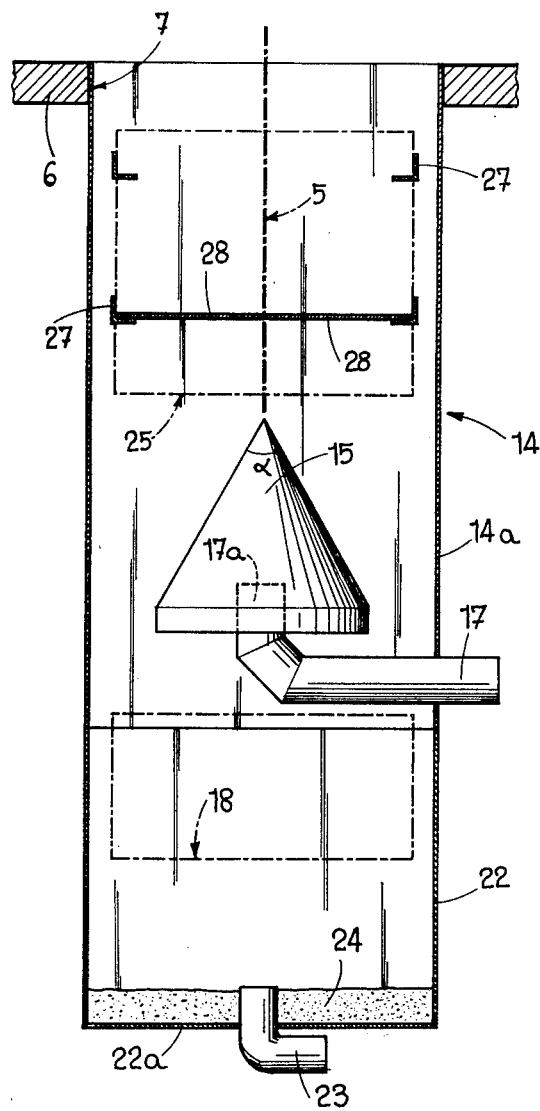
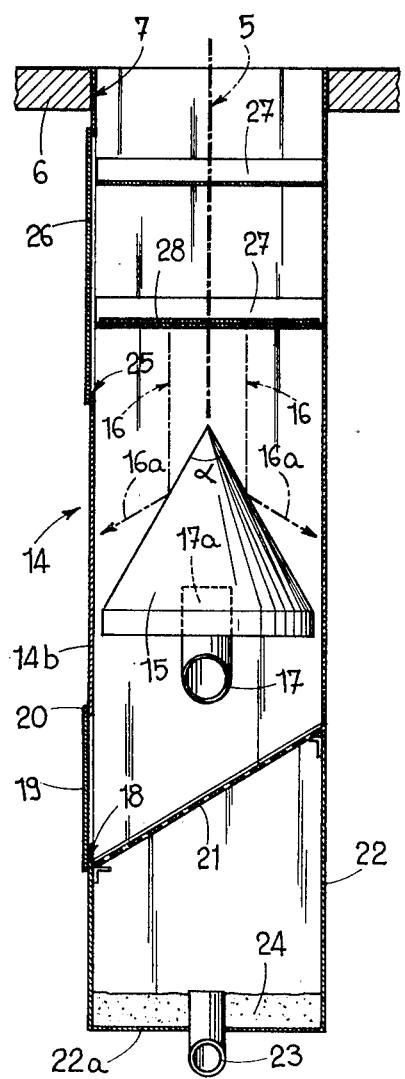
FIG. 3
FIG. 4

MACHINE FOR CUTTING SHEET MATERIAL

BACKGROUND OF THE INVENTION (a) Field of the Invention

The present invention relates to a machine for cutting sheet material by means of a stationary laser beam, comprising a table provided with an opening through which the laser beam passes.

(b) Description of the Prior Art

The recovering of the cut-out members gives rise, during the laser cutting, to problems due to the fact that these members risk deterioration by the laser beam during continuation of the cutting operation.

SUMMARY OF THE INVENTION

The object of the invention is to provide means to overcome the foregoing problems without, however, the members having to be recovered one after another, which would necessitate successive interruptions of the operation of the machine.

This object is achieved, according to the invention, by providing, under the table of the machine, a deflector which ensures dispersion of the energy of the laser beam and means for recovering the cut-out members, the arrangement being such that said members are not subject to deterioration by the laser beam during continuation of the cutting operation.

The various features of the invention will be apparent from the following description, drawings and claims, the scope of the invention not being limited to the drawings themselves as the drawings are only for the purpose of illustrating a way in which the principles of the invention can be applied. Other embodiments of the invention utilizing the same or equivalent principles may be used and structural changes may be made as desired by those skilled in the art without departing from the present invention and the purview of the appended claims.

BRIEF DESCRIPTION OF THE DRAWINGS

FIG. 3 is a vertical transverse sectional view of a detail of the machine, to a larger scale, and FIG. 4 is a sectional view on the line IV—IV of FIG. 3.

DESCRIPTION OF THE PREFERRED EMBODIMENT

The machine described and illustrated comprises a frame 1 provided with an upright column 2 extended by a bracket 3, containing the laser generator (not shown) and at the free end of which is secured a cutting head, designated by reference 4, containing optical elements of the machine, constituted by a set of lenses and by a mirror which is inclined at 45° to deflect the initially horizontal axis of the laser beam and render it vertical, as indicated at 5.

Figure 1:
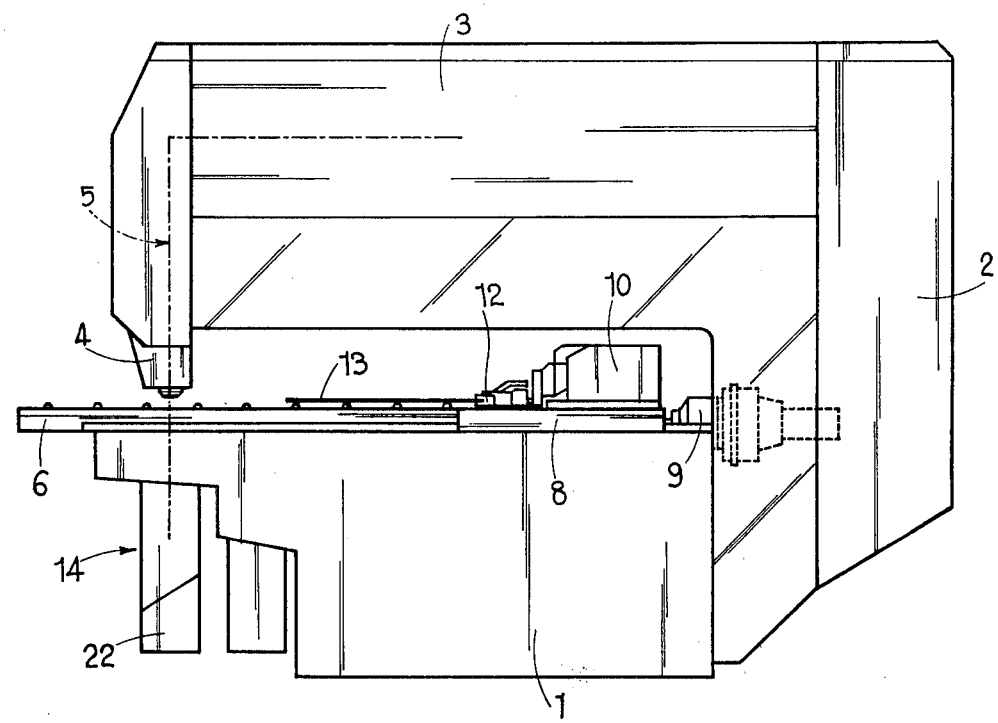
FIG. 1 is a side elevation view of a machine for cutting sheet material, especially sheet iron, representing a preferred embodiment of the invention.
Figure 2:
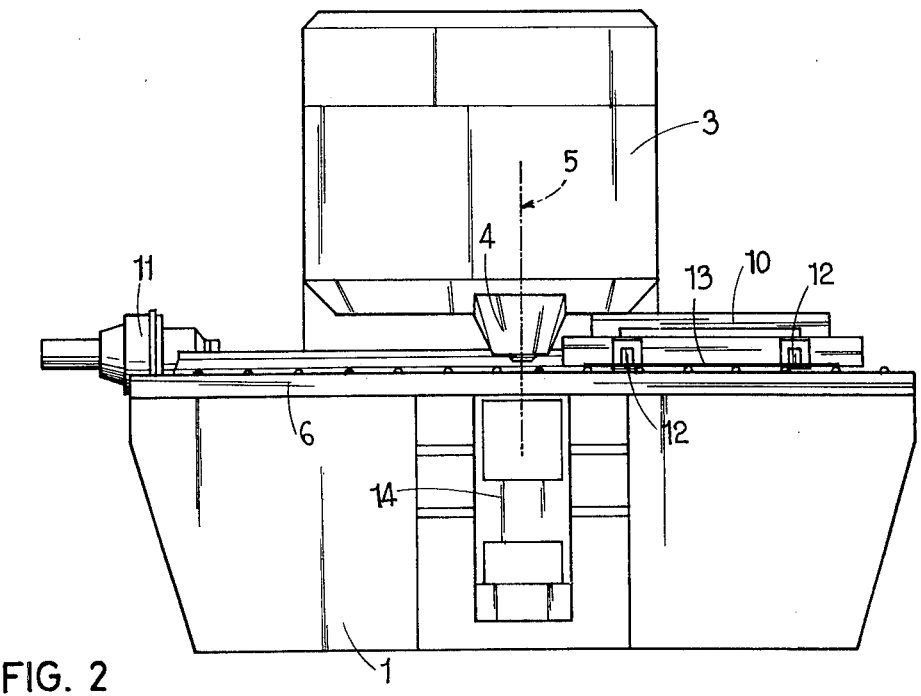
FIG. 2 is a front elevation of this machine.

The machine further comprises a table 6 provided with rolling support balls. This table is provided with an opening 7 coaxial with the laser beam 5. The machine also comprises a longitudinal carriage 8, displacement of which is controlled by a motor 9, and a carriage 10 itself movable transversely on the carriage 8, the displacement of which is controlled by a motor 11. The carriage 10 is provided with pincers 12 operative to grip the sheet material to be worked, such as the iron sheet 13 shown in FIGS. 1 and 2.

The machine includes a vessel 14 of rectangular section, illustrated in detail in FIGS. 3 and 4, situated under the table 6 below the central opening 7 in the table, this vessel contains a deflector 15 of the laser beam constituted by a conical cap made of a dull black anodised sheet of aluminum, for example, the cone axis of which coincides with the axis 5 of the laser beam. The cone angle $\alpha$ of the cap is less than 90° so that the angle between each of the incident rays 16 of the laser beam and the generatrix line of the cone 15 which it intersects is less than 45°. As a result each of said rays 16 is thus reflected downwardly, as indicated at 16a in FIG. 4.

One of the side walls, designated by 14a, of the vessel 14 has passing through it a horizontal pipe 17 the inner end 17a of which, bent upwards at right angle, is situated under the deflector 15. This pipe 17 serves for the evacuation of air and the residual working gas.

The front face 14b of the vessel 14 has an aperture 18 which is provided with a door 19, top hinged at 20, and opposite which is disposed, within the vessel, an inclined grid 21. This grid 21, which is removable, is intended to receive the cut-out members which are separated from the work sheet 13 situated on the table 6. It is sufficient periodically to lift the door 19 in order to recover the members which have collected at the bottom of the grid 21. Owing to the fact that the deflector 15 disperses the energy of the laser beam, the latter does not cause any deterioration of the members while they are resting on the grid 21.

The waste, constituted by scoria or cutting calamine, passes through the grid 21 and accumulates, together with the liquid (water) provided for cooling or for lubrication and which can advantageously be projected on to the work sheet, at the bottom of the vessel 14. The lower part 22 of the vessel 14, which carries the grid 21 removably mounted thereon, is also itself removable, which enables it to be cleaned out periodically to remove said waste. The bottom, designated by reference 22a, of this lower part, has passing through it a pipe 23 for evacuation of the coolant liquid. The inner end of this pipe is situated a distance above the level of the bottom 22a so that some quantity of liquid remains at 24 at the bottom of the vessel where the scoria and cutting calamine are decanted.

Finally, the vessel 14 is provided, at its upper part, with an aperture 25 closed by a door 26 which allows the introduction into the vessel, by placing it on brackets 27 with which this vessel is provided for the purpose, of a target 28 on which the impact of the laser beam is visible. This enables the coaxiality of the beam axis and the axis of the lens system of the optical means of the machine to be adjusted, which adjustment is effected by adjusting the position of the 45° mirror of the optical means.

It is to be noted that the present machine can serve not only for cutting metal sheets, but also for cutting of any sheet material, for example plastics material, glass, wood, etc.

We claim:

1. A machine for cutting sheet material by means of a stationary laser beam, comprising a table provided with an opening through which the laser beam passes, and which further comprises, disposed under said table, a deflector means for deflecting rays of the laser beam which ensures the dispersion of the energy of the laser beam and means for recovering the cut-out members, the arrangement being such that said members are not subject to deterioration by the laser beam during continuation of the cutting operations.

2. A machine as claimed in claim 1, in which said deflector means is located in a vessel situated under the table and which contains also a device to separate the cut-out members from waste, such as scoria and cutting calamine, this vessel being provided with means for evacuation of the residual working gas.

3. A machine as claimed in claim 2, in which said vessel moreover provides a decantor for coolant liquid, in which the coolant liquid is separated from the scoria and cutting calamine, the vessel being provided with a pipe for evacuation of the decanted liquid.

4. A machine as claimed in claim 1, in which the said deflector means comprises a conical member coaxial with the axis of the laser beam and including a cap which deflects the rays of the said beam.

5. A machine as claimed in claim 4, in which the apex angle of the deflecting cone is less than 90° so that the angle between the rays of the laser beam and the generatrices of said cap which intersects each of said rays is less than 45° so that said rays are deflected downwardly.

6. A machine as claimed in claim 2 or 4, in which said means for evacuation of the residual working gas comprise a pipe an inlet opening of which is situated under the deflecting cone.

* * * * *